United States Patent
Yoo et al.

(10) Patent No.: US 9,302,661 B2
(45) Date of Patent: Apr. 5, 2016

(54) BRAKING SYSTEM FOR HYBRID VEHICLE AND CONTROL METHOD FOR THE SAME

(71) Applicants: Hyundai Motor Company, Seoul (KR); Research & Business Foundation, Sungkyunkwan University, Suwon-si (KR)

(72) Inventors: Byoung Soo Yoo, Incheon (KR); Hyun-Soo Kim, Seoul (KR); Ji-Weon Ko, Suwon-si (KR)

(73) Assignees: Hyundai Motor Company, Suwon-si (KR); Research & Business Foundation, Sungkyunkwan University, Seoul (KR)

( * ) Notice: Subject to any disclaimer, the term of this patent is extended or adjusted under 35 U.S.C. 154(b) by 156 days.

(21) Appl. No.: 13/712,780

(22) Filed: Dec. 12, 2012

(65) Prior Publication Data

US 2014/0100751 A1    Apr. 10, 2014

(30) Foreign Application Priority Data

Oct. 5, 2012    (KR) .................... 10-2012-0110932

(51) Int. Cl.
| | |
|---|---|
| *B60T 13/58* | (2006.01) |
| *B60T 13/12* | (2006.01) |
| *B60T 7/04* | (2006.01) |
| *B60T 1/10* | (2006.01) |

(52) U.S. Cl.
CPC . *B60T 13/12* (2013.01); *B60T 1/10* (2013.01); *B60T 7/042* (2013.01); *B60T 13/586* (2013.01); *B60T 2220/04* (2013.01); *B60T 2270/604* (2013.01); *Y10S 903/947* (2013.01)

(58) Field of Classification Search
CPC .......................... B60W 20/30; B60T 2270/60
USPC .......................................................... 701/70
See application file for complete search history.

(56) References Cited

U.S. PATENT DOCUMENTS

| | | | | |
|---|---|---|---|---|
| 5,399,000 | A * | 3/1995 | Aoki et al. ................... | 303/3 |
| 2003/0234577 | A1 | 12/2003 | Crombez | |
| 2007/0018499 | A1* | 1/2007 | Kokubo ............... | B60K 6/445 303/151 |
| 2008/0100129 | A1* | 5/2008 | Lubbers ................. | 303/113.1 |
| 2009/0256417 | A1* | 10/2009 | Ishii et al. ................. | 303/152 |
| 2013/0331227 | A1* | 12/2013 | Kato ............................ | 477/3 |

FOREIGN PATENT DOCUMENTS

| | | |
|---|---|---|
| JP | 2005-324640 A | 11/2005 |
| JP | 4370781 B2 | 9/2009 |
| JP | 4581905 B2 | 9/2010 |
| KR | 10-0819978 B1 | 3/2008 |
| KR | 10-2009-0045890 A | 5/2009 |
| WO | WO 2011135910 A1 * | 11/2011 |

\* cited by examiner

*Primary Examiner* — Helal A Algahaim
*Assistant Examiner* — Genna Mott
(74) *Attorney, Agent, or Firm* — Morgan, Lewis & Bockius LLP

(57) ABSTRACT

A braking system for hybrid vehicle may include a brake pedal, a pedal stroke sensor detecting stroke of the brake pedal and outputting corresponding signal, a brake control unit receiving the signal of the pedal stroke sensor, a driving wheel caliper braking a driving wheel according to control of the brake control unit, a regenerative braking unit including a motor/generator which generates electric energy according to control of the brake control unit in braking of the driving wheel, a master cylinder connected with the brake pedal and operated by the brake pedal, and a driven wheel caliper braking a driven wheel according to operation of the master cylinder.

10 Claims, 4 Drawing Sheets

BRAKING SYSTEM FOR HYBRID VEHICLE AND CONTROL METHOD FOR THE SAME

CROSS-REFERENCE TO RELATED APPLICATION

The present application claims priority to Korean Patent Application No. 10-2012-0110932 filed on Oct. 5, 2012, the entire contents of which is incorporated herein for all purposes by this reference.

BACKGROUND OF THE INVENTION

1. Field of the Invention

The present invention relates to a braking system for hybrid vehicle and control method for the same. More particularly, the present invention relates to a braking system for hybrid vehicle and control method for the same which may realize regenerative braking and maintain brake feeling without a pedal simulator.

2. Description of Related Art

A cooperative control for regenerative braking system for a hybrid vehicle includes a simulator (BAU; Brake Actuation Unit) for generating a signal of driver's pedal operation and compensating operation feeling, and a control element (HPU; Hydraulic Power Unit) for controlling braking power of a brake.

When a driver pushes a brake pedal, a signal of a stroke sensor is generated and transmitted to the HPU, and the HPU generates brake hydraulic pressure according to the signal of the stroke sensor. Then the brake hydraulic pressure is applied to each brake of front and rear wheels through a wheel control unit simultaneously. The wheel control unit means an ABS (anti-lock braking system), a TCS (traction control system), an ESC (electric control suspension), an ESP (electronic stability control) and so on.

In braking of a vehicle, the HPU controls the brake hydraulic pressure to be closed for maximizing regenerative braking torque of a motor/generator at initial stage, and then the HPU controls the brake hydraulic pressure to be supplied in stopping regenerative braking or compensating braking force.

However, the regenerating system of the related art is complicated and reaction speed for braking is retarded. Also, with the pedal simulator, a driver may not satisfy brake feeling (pedal operation feeling).

Also, in the system, since the amplified pressure by the HPU is equally supplied to each brake of front and rear wheels, and thus the rear wheel brake (e.g., a driven wheel brake) may not be used in the cooperative regenerative braking controlling. So braking efficiency may be deteriorated and regenerative braking load is always applied to a front wheel (e.g., driving wheel) in braking. Thus, brake lock may occur to the front wheel so as to deteriorate braking performance, and durability of the front wheel brakes and tires may be deteriorated.

Also, since the system requires the BAU, the HPU and so on for the regenerative braking, weight and cost may be increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a braking system for hybrid vehicle and control method for the same which may realize regenerative braking and maintain brake feeling without a pedal simulator.

In an aspect of the present invention, a braking system for a hybrid vehicle may include a brake pedal, a pedal stroke sensor detecting a stroke of the brake pedal and outputting a corresponding signal, a brake control unit receiving the signal of the pedal stroke sensor, a driving wheel caliper braking a driving wheel according to control of the brake control unit, a regenerative braking unit including a motor/generator which generates electric energy according to control of the brake control unit in braking of the driving wheel, a master cylinder connected with the brake pedal and operated by the brake pedal, and a driven wheel caliper braking a driven wheel according to operation of the master cylinder.

The brake control unit determines a required braking force based on the signal of the pedal stroke sensor, wherein the brake control unit determines braking force of the driving wheel required for the driving wheel by subtracting braking force of the driven wheel from the required braking force, and wherein the brake control unit controls operations of the driving wheel caliper and the regenerative braking unit based on the determined required braking force of the driving wheel.

The brake control unit controls the operation of the driving wheel caliper based on value of which regenerative braking force of the regenerative braking unit subtracted from the braking force of the driving wheel.

The brake control unit determines the regenerative braking force accords multiplying current torque of the motor/generator by gear ratio of a shift range.

The brake control unit determines efficiency of the motor/generator by assuming torque of the motor/generator, and the brake control unit compares an efficiency of the motor/generator with a predetermined efficiency of a standard motor/generator for regenerative braking in order to determine the shift range.

The braking system may further include a wheel control unit which is operated by hydraulic pressure of the master cylinder and controls operation of the driven wheel caliper by hydraulic pressure.

The brake pedal may have predetermined dead stroke, and the braking force of the driven wheel is "0" in the dead stroke of the brake pedal.

In another aspect of the present invention, a control method for a hybrid vehicle may include determining a first braking force of a driven wheel when a brake pedal is operated, determining a required braking force when the brake pedal is operated, determining a second braking force of a driving wheel required to the driving wheel by subtracting the first braking force of the driven wheel from the required braking force, and controlling a braking of the driving wheel according to a value of which a third braking force of a regenerative braking unit is subtracted from the required braking force of the driving wheel.

The braking of the driving wheel is executed by operating the regenerative braking unit when the value of which the third braking force of the regenerative braking unit is subtracted from the required braking force of the driving wheel is less than "0".

The braking of the driving wheel is executed by operating both of the regenerative braking unit and the driving wheel caliper when the value of which the braking force of the regenerative braking unit is subtracted from the required braking force of the driving wheel is equal or larger than "0".

The brake pedal may have predetermined dead stroke, and the first braking force of the driven wheel is "0" in the dead stroke of the brake pedal.

The regenerative braking force is determined by multiplying current torque of the motor/generator by gear ratio of a shift range.

Efficiency of the motor/generator is determined by assuming a torque of the motor/generator, and a determined efficiency of the motor/generator and a predetermined efficiency of a standard motor/generator for regenerative braking are compared in order to determine the shift range.

A current shift range is maintained when the determined efficiency of the motor/generator is equal to or larger than the predetermined efficiency of the standard motor/generator for regenerative braking, wherein the current shift range is lowered when the determined efficiency of the motor/generator is less than the predetermined efficiency of the standard motor/generator for regenerative braking.

A braking system for hybrid vehicle and control method for the same according to an exemplary embodiment of the present invention may realize regenerative braking and maintain brake feeling without a pedal simulator.

According to an exemplary embodiment of the present invention of the braking system for hybrid vehicle and the control method for the same, braking force is distributed properly, so that it is prevented from occurring brake lock to a driving wheel, braking performance may be realized stably, and durability of brakes and tires of driving wheels.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
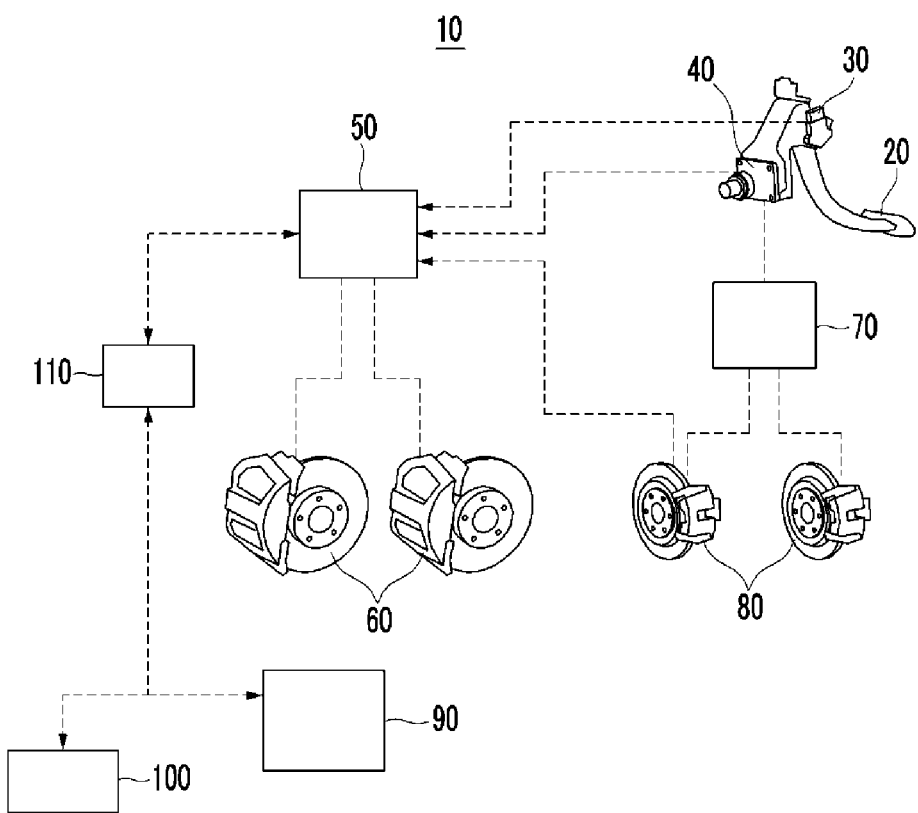
FIG. 1 is a drawing showing a braking system for hybrid vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention The drawings and description are to be regarded as illustrative in nature and not restrictive. Like reference numerals designate like elements throughout the specification.

Throughout the specification, unless explicitly described to the contrary, the word "include" and variations such as "includes" or "including", will be understood to imply the inclusion of stated elements but not the exclusion of any other elements.

An exemplary embodiment of the present invention will hereinafter be described in detail with reference to the accompanying drawings.

FIG. 1 is a drawing showing a braking system for hybrid vehicle according to an exemplary embodiment of the present invention.

Referring to FIG. 1, a braking system for a hybrid vehicle 10 according to an exemplary embodiment of the present invention includes a brake pedal 20, a pedal stroke sensor 30 detecting stroke of the brake pedal 20 and outputting corresponding signal, a brake control unit 50 receiving the signal of the pedal stroke sensor 30, a driving wheel caliper 60 braking a driving wheel according to control of the brake control unit 50, a regenerative braking unit including a motor/generator 90 which generates electric energy according to control of the brake control unit 50 in braking of the driving wheel, a master cylinder 40 connected with the brake pedal 20 and operated by the brake pedal 20, and a driven wheel caliper 80 braking a driven wheel according to operation of the master cylinder 40.

The driving wheel caliper 60 and the driven wheel caliper 80 are adopted for braking the driving wheel and the driven wheel respectively, and functions and scheme thereof are obvious to a person skill in the art. And thus detailed description will be omitted.

The braking system for a hybrid vehicle 10 may further include a wheel control unit 70 which is operated by hydraulic pressure of the master cylinder 40 and controls operation of the driven wheel caliper 80.

The regenerative braking unit may include a transmission 100 driving the driving wheel by reducing or increasing rotation of the motor/generator 90, and also may include a HCU (hybrid control unit, 110) which control operations of the motor/generator 90, the transmission 100 and an engine and operation of regenerative braking in braking.

In this case, functions and scheme of the brake control unit 50 and the HCU 110 are performed and provided separately, or the functions and scheme may be formed as one control system, for example one integrated system may realize braking control, speed/torque control, regenerative control and so on. Throughout the specification and the claims, the HCU 110 will be described to control the operations of the motor/generator (regenerative braking) and the transmission unless otherwise specially stated.

The motor/generator 90, as a usual a motor/generator applied to a hybrid vehicle, may be operated independently, or together with the engine for driving the vehicle, and may regenerate electrical energy using kinetic energy of the vehicle in deceleration of the vehicle. The scheme and operation of the motor/generator 90 are obvious to a person skilled in the art, and thus detailed description will be omitted.

Usually, the driving wheel and driven wheel are a front wheel and a rear wheel, however it is not limited thereto. The driving wheel and driven wheel may be a rear wheel and a front wheel respectively.

The driving wheel caliper 60 is an electric type caliper and is mounted to the driving wheel, and the motor/generator 90 is connected to the driving wheel through the transmission 100.

When the brake pedal 20 operates the master cylinder 40 to generate hydraulic pressure in operation, and the wheel control unit 70 may control the operation of the driven wheel caliper 80 using the hydraulic pressure of the master cylinder 40. The driven wheel caliper 80 may be a hydraulic pressure type caliper. The wheel control unit 70 may be an ABS (anti-lock braking system), a TCS (traction control system), an ESC (electric control suspension), an ESP (electronic stability control) and so on for example.

In a general brake system of a vehicle, a master cylinder is operated using negative pressure of a booster. However, in an exemplary embodiment of the present invention, the braking system for a hybrid vehicle 10 just operates the driven wheel caliper 80 using the hydraulic pressure. So the general booster is not required and thus the entire system may be simplified. Also, since the wheel control unit 70 controls just the operation of the driven wheel, and thus the hydraulic circuit may be simplified.

The brake control unit 50 calculates required braking force based on the signal from the pedal stroke sensor 30, calculates braking force of the driving wheel by subtracting braking force of the driven wheel from the required braking force, and controls operations of the driving wheel caliper 60 and the regenerative braking unit based on the calculated braking force of the driving wheel.

The brake pedal 20 has predetermined dead stroke, and the braking force of the driven wheel is "0" in the dead stroke of the brake pedal 20. Thus, the required braking force is the braking force of the driving wheel in the dead stroke of the brake pedal 20.

The brake control unit 50 controls the operation of the driving wheel caliper 60 based on a value of regenerative braking force of the regenerative braking unit subtracted from the calculated braking force of the driving wheel.

The regenerative braking force is determined by multiplying current torque of the motor/generator 90 by gear ratio of a shift range.

The HCU 110 estimates the torque of the motor/generator and calculates efficiency of the motor/generator 90, and then the current shift range is determined by comparing the efficiency of the motor/generator 90 with predetermined standard motor/generator efficiency for regenerative braking.

Figure 2:
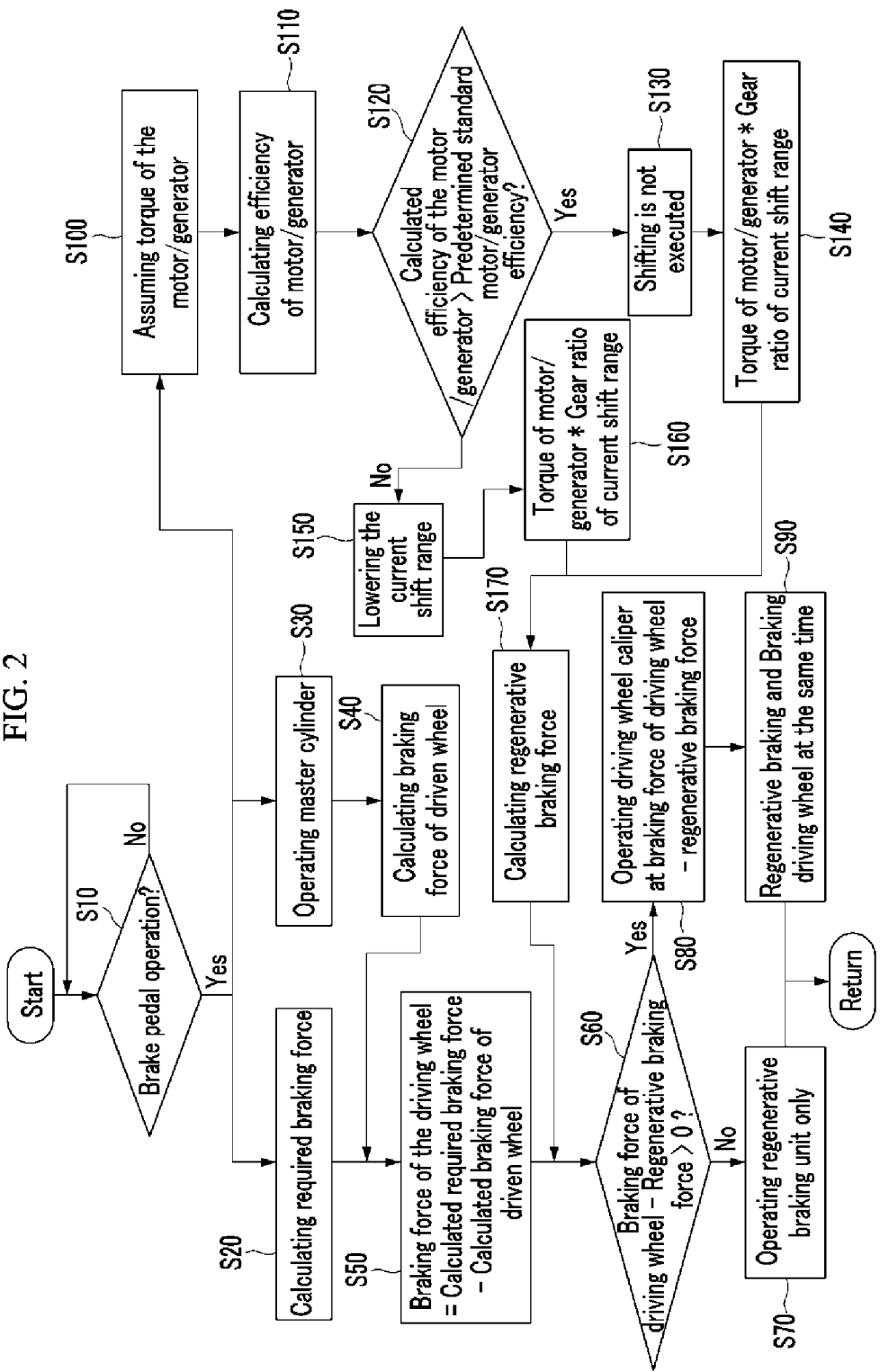
FIG. 2 is a flowchart of a control method for hybrid vehicle according to an exemplary embodiment of the present invention.

FIG. 2 is a flowchart of a control method for hybrid vehicle according to an exemplary embodiment of the present invention.

Referring to FIG. 1 and FIG. 2, the control method of braking system for a hybrid vehicle according to an exemplary embodiment of the present invention will be discussed.

FIG. 1 and referring to FIG. 2, a control method for hybrid vehicle according to an exemplary embodiment of the present invention includes determining whether the brake pedal 20 is operated or not at the step S10, calculating braking force of the driven wheel when the brake pedal 20 is operated at the step S40, calculating required braking force when the brake pedal 20 is operated at the step S20, calculating braking force of the driving wheel required to the driving wheel by subtracting the calculated braking force of the driven wheel from the calculated required braking force at the step S50, and controlling the braking of the driving wheel according to a value of which braking force of the regenerative braking unit is subtracted from the calculated required braking force of the driving wheel.

When the brake pedal 20 is operated, the master cylinder 40 is operated at the step S30, the signals of a pressure sensor sensing the operation of the master cylinder 40, the pedal stroke sensor 30, or a brake sensor mounted to the driven wheel caliper 80 input to the brake control unit 50. And then the brake control unit 50 determines whether the driven wheel caliper 80 is operated practically or not, and determines the driven wheel caliper 80 is operated in dead stroke zone before the driven wheel caliper 80 is operated practically at the step S40.

Even though the brake pedal 20 is operated in the dead stroke zone, the brake control unit 50 determines the braking force of the driven wheel is "0". And then the brake control unit 50 calculates the braking force of the driven wheel when the braking force of the driven wheel occurs at the step S40. So the required braking force is the braking force of the driving wheel in the dead stroke zone of the brake pedal 20.

At the step S20, the brake control unit 50 calculates the required braking force (total braking force) a driver needs based on the corresponding signal of the pedal stroke sensor 30.

At the step S50, the brake control unit 50 calculates the braking force of the driving wheel by subtracting the braking force of the driven wheel (not in the dead stroke) from the required braking force.

If a value subtracting the regenerative braking force from the braking force of the driving wheel is less than "0" at the step S60, the braking of the driving wheel is realized by operating the regenerative braking unit only at the step S70. That is, just the regenerative braking force is applied to the driving wheel.

If a value subtracting the regenerative braking force from the braking force of the driving wheel is larger than "0" at the step S80, the braking of the driving wheel is realized by operating the regenerative braking unit as well as the driving wheel caliper 60 at the step S90. That is, the regenerative braking force and braking force of the driving wheel caliper 60 are applied to the driving wheel.

In this case, the value subtracting the regenerative braking force from the braking force of the driving wheel is applied by the driving wheel caliper 60.

The regenerative braking force is determined by multiplying current torque of the motor/generator 90 by gear ratio of a current shift range. (S140, S160 and S170)

The regenerative braking force may be determined by the HCU 110, or a control portion combined by the brake control unit 50 and the HCU 110.

The current shift range is determined based on the efficiency of the motor/generator calculated by assuming the torque of the motor/generator 90 by the HCU 110, and the calculated efficiency of the motor/generator 90 and the predetermined standard motor/generator efficiency for regenerative braking are compared in order to determine the shift range at the step S100, S110 and S120

The assuming of the torque of the motor/generator 90 may be realized based on speed of a vehicle, rotation speed of the motor/generator 90, acceleration of a vehicle and so on. The assuming may be obvious to a person skilled in the art, and thus detailed description will be omitted.

The efficiency of the motor/generator 90 may be determined based on rotation speed of the motor/generator 90, state of charge of a battery and so on, and it is obvious to a person skilled in the art, and thus detailed description will be omitted.

The predetermined standard motor efficiency may be defined as minimum efficiency for the regenerative braking, and it may be determined at experiment or design process. The minimum efficiency for the regenerative braking the regenerative braking is obvious to a person skilled in the art, and thus detailed description will be omitted.

The HCU 110 maintains the current shift range if the calculated efficiency of the motor/generator 90 is equal to or larger than the predetermined standard motor/generator efficiency for regenerative braking, and the HCU 110 lowers the current shift range if the calculated efficiency of the motor/generator 90 is less than the predetermined standard motor/generator efficiency for regenerative braking at the step S130 and S150. That is, if the current shift range is proper to realize the regenerative braking, the current shift range is maintained. But if the current shift range is not proper to realize the regenerative braking, the transmission 100 is controlled to lower the current shift range at the step S130 and S150.

Figure 3:
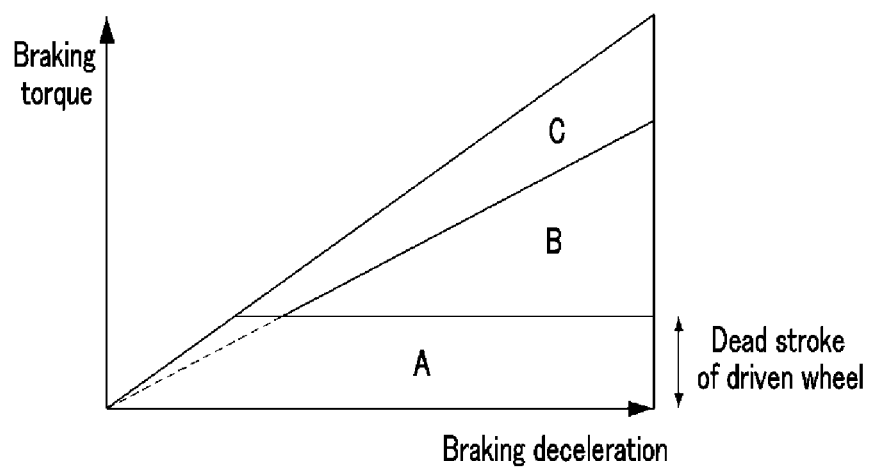
FIG. 3 is a graph showing relationship of deceleration torque and deceleration feeling according to a braking system for hybrid vehicle according to an exemplary embodiment of the present invention.
Figure 4:
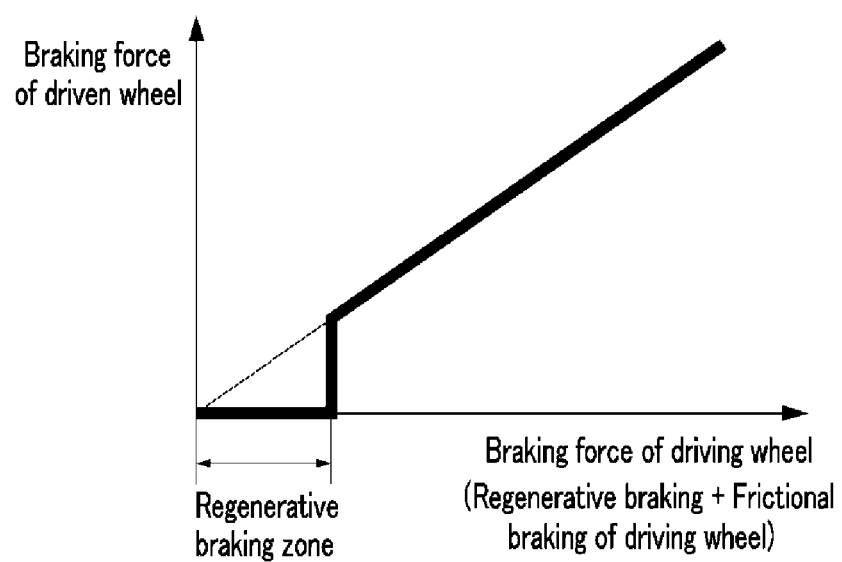
FIG. 4 is a graph showing relationship of braking force between a driving wheel and a driven wheel according to a braking system for hybrid vehicle according to an exemplary embodiment of the present invention.

FIG. 3 is a graph showing relationship of deceleration torque and deceleration feeling according to a braking system for hybrid vehicle according to an exemplary embodiment of the present invention, and FIG. 4 is a graph showing relationship of braking force between a driving wheel and a driven wheel according to a braking system for hybrid vehicle according to an exemplary embodiment of the present invention.

In FIG. 3, A denotes braking torque by the regenerative braking, B denotes braking torque due to the driving wheel caliper 60, and C denotes braking torque due to the driven wheel caliper 80.

As shown in FIG. 3 and FIG. 4 the braking system for a hybrid vehicle according to an exemplary embodiment of the present invention may use dead stroke of which the braking force is "0" until the braking torque of the driven wheel caliper 80 is generated by the hydraulic pressure of the master cylinder 40 triggered by the pedal operation. Thus the combination control of the regenerative braking force of the motor/generator 90 mounted to the driving wheel and the braking force of the electric caliper 60 may realize braking and simultaneously withdraws electric energy.

In the braking system for a hybrid vehicle according to an exemplary embodiment of the present invention, since the driving wheel brake realizing the regenerative braking is controlled separated from the driven wheel brake, regenerative braking combination control may be realized without a separated simulator. Since the brake pedal, the master cylinder, and the driven wheel brake are connected directly without a pedal simulator, a driver may feel braking feeling similar to that which a general vehicle may offer.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A braking system for a hybrid vehicle comprising:
   a brake pedal;
   a pedal stroke sensor detecting a stroke of the brake pedal and outputting a corresponding signal;
   a brake control unit receiving the signal of the pedal stroke sensor;
   a driving wheel caliper braking a driving wheel according to control of the brake control unit;
   a regenerative braking unit including a motor/generator generating electric energy according to control of the brake control unit in braking of the driving wheel;
   a master cylinder connected with the brake pedal and operated by the brake pedal; and
   a driven wheel caliper braking a driven wheel according to operation of the master cylinder,
   wherein the brake control unit determines a required braking force based on the signal of the pedal stroke sensor,
   wherein the brake control unit determines a braking force of the driving wheel by subtracting a braking force of the driven wheel from the required braking force determined based on the signal of the pedal stroke sensor, and
   wherein the brake control unit controls operations of the driving wheel caliper and the regenerative braking unit based on the determined braking force of the driving wheel,
   wherein when a value determined from subtracting a regenerative braking force from the braking force of the driving wheel is larger than zero, the brake control unit controls operation of the driving wheel caliper based on the value of the regenerative braking force of the regenerative braking unit subtracted from the braking force of the driving wheel, and
   wherein the brake pedal has a predetermined dead stroke and the braking force of the driven wheel is "0" in the predetermined dead stroke of the brake pedal and only the regenerative braking unit is operated in the predetermined dead stroke.

2. The braking system of claim 1, wherein the brake control unit determines the regenerative braking force according to multiplying current torque of the motor/generator by gear ratio of a shift range.

3. The braking system of claim 2, wherein the brake control unit determines an efficiency of the motor/generator by assuming torque of the motor/generator, and the brake control unit compares the efficiency of the motor/generator with a predetermined efficiency of a standard motor/generator for regenerative braking in order to determine the shift range.

4. The braking system of claim 1, further including:
   a wheel control unit which is operated by hydraulic pressure of the master cylinder and controls operation of the driven wheel caliper by hydraulic pressure.

5. A control method of controlling a braking system for a hybrid vehicle, comprising:
   determining, by a brake control unit, a first braking force of a driven wheel when a brake pedal is operated;
   determining, by the brake control unit, a required braking force when the brake pedal is operated; and determining, by the brake control unit, a second braking force of a driving wheel by subtracting the first braking force of the driven wheel from the required braking force;

wherein the braking system includes:
  the brake pedal;
  a pedal stroke sensor detecting a stroke of the brake pedal and outputting a corresponding signal;
  the brake control unit receiving the signal of the pedal stroke sensor;
  a driving wheel caliper braking the driving wheel according to control of the brake control unit;
  the regenerative braking unit including a motor/generator generating electric energy according to control of the brake control unit in braking of the driving wheel;
  a master cylinder connected with the brake pedal and operated by the brake pedal; and
  a driven wheel caliper braking the driven wheel according to operation of the master cylinder, wherein the brake control unit determines the required braking force based on the signal of the pedal stroke sensor, wherein the brake control unit determines the second braking force of the driving wheel by subtracting the first braking force of the driven wheel from the required braking force determined based on the signal of the pedal stroke sensor, wherein the brake control unit controls operations of the driving wheel caliper and the regenerative braking unit based on the second braking force of the driving wheel, wherein when a value determined from subtracting a regenerative braking force from the second braking force of the driving wheel is larger than zero, the brake control unit controls operation of the driving wheel caliper based on the value of the regenerative braking force of the regenerative braking unit subtracted from the second braking force of the driving wheel, and wherein the brake pedal has a predetermined dead stroke and the first braking force of the driven wheel is "0" in the predetermined dead stroke of the brake pedal, and only the regenerative braking unit is operated in the predetermined dead stroke.

6. The control method of claim 5, wherein the braking of the driving wheel is executed by operating the regenerative braking unit when the value which is determined from subtracting the regenerative braking force from the second braking force of the driving wheel is less than "0".

7. The control method of claim 6, wherein the braking of the driving wheel is executed by operating both of the regenerative braking unit and the driving wheel caliper when the value which is determined from subtracting the regenerative braking force from the second braking force of the driving wheel is equal or larger than "0".

8. The control method of claim 5, wherein the regenerative braking force is determined by multiplying current torque of the motor/generator by gear ratio of a shift range.

9. The control method of claim 8,
  wherein an efficiency of the motor/generator is determined by assuming a torque of the motor/generator; and
  wherein the determined efficiency of the motor/generator and a predetermined efficiency of a standard motor/generator for regenerative braking are compared in order to determine the shift range.

10. The control method of claim 9,
  wherein a current shift range is maintained when the determined efficiency of the motor/generator is equal to or larger than the predetermined efficiency of the standard motor/generator for regenerative braking; and
  wherein the current shift range is lowered when the determined efficiency of the motor/generator is less than the predetermined efficiency of the standard motor/generator for regenerative braking.

\* \* \* \* \*